United States Patent
Aoki et al.

(10) Patent No.: US 6,760,110 B2
(45) Date of Patent: Jul. 6, 2004

(54) LOW COHERENT REFLECTOMETER

(75) Inventors: Syoichi Aoki, Tokyo (JP); Tetsuo Yano, Tokyo (JP); Kenji Senda, Tokyo (JP); Kazumasa Takada, Tokyo (JP)

(73) Assignees: Ando Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 238 days.

(21) Appl. No.: 09/982,557

(22) Filed: Oct. 16, 2001

(65) Prior Publication Data

US 2002/0060794 A1 May 23, 2002

(30) Foreign Application Priority Data

Oct. 18, 2000 (JP) ........................................ 2000-317869

(51) Int. Cl.[7] .......................... G01N 21/55; G01B 9/02; H04B 10/04; H04B 10/12
(52) U.S. Cl. ....................... 356/445; 356/479; 398/182; 398/142; 398/146; 398/148; 398/149; 398/150
(58) Field of Search ....................... 398/182, 140–142, 398/146–150; 356/445, 479

(56) References Cited

U.S. PATENT DOCUMENTS

| | | | | |
|---|---|---|---|---|
| 5,268,738 A | * | 12/1993 | Baney et al. | 356/479 |
| 5,291,267 A | * | 3/1994 | Sorin et al. | 356/479 |
| 5,303,079 A | * | 4/1994 | Gnauck et al. | 398/182 |
| 5,321,501 A | * | 6/1994 | Swanson et al. | 356/479 |
| 5,365,335 A | * | 11/1994 | Sorin | 356/479 |
| 5,459,570 A | * | 10/1995 | Swanson et al. | 356/479 |
| 5,596,409 A | * | 1/1997 | Marcus et al. | 356/479 |
| 5,615,011 A | * | 3/1997 | Boisrobert et al. | 356/479 |
| 6,005,702 A | * | 12/1999 | Suzuki et al. | 398/185 |
| 6,256,102 B1 | * | 7/2001 | Dogariu | 356/479 |
| 6,476,919 B1 | * | 11/2002 | Mori et al. | 356/479 |
| 6,628,401 B2 | * | 9/2003 | Toida | 356/479 |
| 2002/0060794 A1 | * | 5/2002 | Aoki et al. | 356/445 |
| 2002/0118363 A1 | * | 8/2002 | Akikuni et al. | 356/369 |
| 2003/0020920 A1 | * | 1/2003 | Dave et al. | 358/479 |

FOREIGN PATENT DOCUMENTS

| | | | | |
|---|---|---|---|---|
| JP | 06-331712 | | 12/1994 | ......... G01R/31/302 |
| JP | 07098264 A | * | 4/1995 | .......... G01M/11/02 |
| JP | 07243939 A | * | 9/1995 | .......... G01M/11/02 |
| JP | 2000-097856 | | 4/2000 | .......... G01N/21/47 |

* cited by examiner

Primary Examiner—David Gray
Assistant Examiner—Magda Cruz
(74) Attorney, Agent, or Firm—Darby & Darby

(57) ABSTRACT

A low coherent reflectometer uses low coherent beams for measurement of refletance and refleting positions with respect to a measured optical circuit which includes a reflecting point. The low coherent beams are branched to produce measurement beams (DL) and local beams (KL), so that the measurement beams are introduced into a first optical path, which includes a dispersion shifted fiber, towards the measured optical circuit, while the local beams are introduced into a second optical path which includes a spatial optical path terminated by a reflecting mirror. Refleted measurement beams (RL) and reflected local beams are combined together to produce combined beams, which are subjected to processing and analysis.

10 Claims, 5 Drawing Sheets

LOW COHERENT REFLECTOMETER

BACKGROUND OF THE INVENTION

1. Field of the Invention

This invention relates to low coherent reflectometers that use low coherent light beams for measuring reflectance and reflecting positions in measured optical circuits such as optical waveguides, optical modules, and the like.

2. Description of the Related Art

FIG. 8 shows a simplified configuration of a conventional low coherent reflectometer. Herein, reference numeral 100 designates a low coherent light source such as a light emitting diode (LED) that radiates low coherent light beams (simply, referred to as low coherent beams). One end of an optical fiber 101 is connected to an outgoing terminal of the low coherent light source 100. Reference numeral 102 designates an optical coupler having four ports, which are designated by reference numerals 102a to 102d respectively. The other end of the optical fiber 101 is connected to the port 102a of the optical coupler 102. In the optical coupler 102, low coherent beams incoming from the port 102a are subjected to branching in response to a prescribed intensity ratio (e.g., one-to-one ratio), so that branched beams are respectively output from the ports 102b and 102c. One end of an optical fiber 103 is connected to the port 102b of the optical fiber 102. The other end of the optical fiber 103 is connected to a measured optical circuit 104 which is a measured subject having a reflecting point therein.

One end of an optical fiber 105 is connected to the port 102c of the optical coupler 102. Reference numeral 106 designates a collimator lens whose focal point is set in advance and which is located at a terminal end 105a of the optical fiber 105. Reference numeral 107 designates a reflecting mirror for reflecting incoming beams that are transmitted thereto by way of the collimator lens 106. In addition, a stage (not shown) is provided to vary the distance between the collimator lens 106 and the reflecting mirror 107. One end of an optical fiber 108 is connected to the port 102d of the optical coupler 102, while the other end is connected to a received light signal processor 109. The received light signal processor 109 provides two light receiving elements (not shown) that respectively receive light beams entering from the optical fiber 108. The light receiving elements perform photoelectric conversion on the received light beams to produce electric signals. In addition, the light receiving elements also amplify differences between the electric signals.

Next, a description will be given with respect to the operations of the low coherent reflectometer shown in FIG. 8. First, low coherent beams generated by the low coherent light source 100 are subjected to branching by the optical coupler 102. The first of the branched beams are introduced into the measured optical circuit 104 as measurement beams by way of the optical fiber 103. Then, the measured optical circuit 104 produces reflected beams, which are transmitted back to the port 102b of the optical fiber 102 by way of the optical fiber 103.

The other of the branched beams output from the optical coupler 102 are introduced into the optical fiber 105 as local beams. Therefore, the local beams are output from the terminal end 105a of the optical fiber 105 and propagate towards the collimator lens 106. The collimator lens 106 converts them to parallel beams, which are then subjected to reflection of the reflecting mirror 107. The reflected beams are subjected to convergence by the collimator lens 106. The converged beams are introduced into the optical fiber 105 from its terminal end 105a Then, they are transmitted to the optical coupler 102 via the port 102c.

In the optical coupler 102, the reflected measurement beams input from the port 102b and the reflected local beams input from the port 102c are combined. If the optical path for transmission of the measurement beams matches the optical path for transmission of the local beams, interference may occur in the optical coupler 102. Of the combined beams produced inside of the optical coupler 102, the beams output from the port 102d are subjected to photoelectric conversion and differential amplification by the light receiving elements, which are provided inside the received light signal processor 109.

It is possible to vary the spatial optical path length by moving the reflecting mirror 107 on the stage along the optical axis direction at a constant velocity. Therefore, it is possible to vary the optical path length for propagation of the local beams leaving from the port 102c of the optical coupler 102. The measurement beams travel from the port 102b of the optical coupler 102 to the measured optical circuit 104 via the optical fiber 103, so that the reflected measurement beams travel backwards by way of the optical fiber 103. Hence, the overall optical path length is established by the optical fiber 103 for transmission of the measurement beams. In addition, the local beams travel from the port 102c of the optical coupler 102 via the optical fiber 105 and also travel towards the reflecting mirror 107 via the collimator lens 106, so that the reflected local beams travel backwards by way of the collimator lens 106 and the optical fiber 105. Hence, the overall optical path length is established by the optical fiber 105, collimator lens 106, and reflecting mirror 107f or transmission and propagation of the local beams. When the overall optical path length of the measurement beams traveling between the port 102b of the optical coupler 102 and the measured optical circuit 104 is equal to the overall optical path length of the local beams traveling between the port 102c of the optical coupler 102, collimator lens 106 and reflecting mirror 107, interference occurs between these beams. Therefore, it is possible to measure the accurate position of the reflecting point in the measured optical circuit 104. Incidentally, details of the aforementioned technique are described in various papers such as Japanese Unexamined Patent Publication No. 2000-97856, for example.

In the aforementioned low coherent reflectometer, the measurement beams are transmitted through the optical fiber 103 only. That is, only a single optical fiber is used to form an optical path for transmitting the reflected measurement beams, which are produced by the measured optical circuit 104. As for the local beams, an overall optical path is composed of the optical fiber 105 and a spatial optical path which is formed across the terminal end 105a of the optical fiber 105, collimator lens 106, and reflecting mirror 107, wherein the spatial optical path has a refractive index of approximately '1'.

As compared with the chromatic dispersions of the measurement beams and the reflected beams in the optical path formed by only the optical fiber 103, the chromatic dispersion of the local beams in the optical path decreases because of the existence of the spatial optical path, in which the local beams leaving from the terminal end 105a of the optical fiber 105 propagate towards the reflecting mirror 107 via the collimator lens 106 so that the reflected local beams propagate backwards to reach the terminal end 105a of the optical fiber 105. In other words, the spatial optical path causes a difference between the chromatic dispersions of the measurement beams and local beams. Such a difference adversely influences and deteriorates the spatial resolution in measurement of reflectance and the like.

In short, the reflecting point of the measured optical circuit 104 can be estimated by causing interference between the reflected measurement beams and the reflected local beams in the optical coupler 102, which is adjusted by varying the spatial optical path of the local beams in response to the movement of the reflecting mirror 107. As the spatial optical path becomes longer, the difference between the chromatic dispersion of the measurement beams and that of the local beams increases, which may result in deterioration of the spatial resolution.

SUMMARY OF THE INVENTION

It is an object of the invention to provide a low coherent reflectometer that can maintain a high spatial resolution in the measurement of reflectance even though the spatial optical path length for propagation of local beams is varied.

A low coherent reflectometer of this invention uses low coherent beams for the measurement of reflectance with respect to a measured optical circuit including a reflecting point. According to the first aspect of the invention, the low coherent beams are branched by an optical coupler to produce measurement beams and local beams. The measurement beams are introduced into a first optical path, which includes a dispersion shifted fiber, towards the measured optical circuit, while the local beams are introduced into a second optical path, which includes a spatial optical path, terminated by a reflecting mirror. Reflected measurement beams and reflected local beams are combined together to produce combined beams, which are subjected to processing and analysis. The spatial resolution is noticeably improved even though the spatial optical path length is varied because the length of the dispersion shifted fiber is determined so as to substantially match the length of the spatial optical path for propagation of the local beams towards the reflecting mirror.

According to the second aspect of the invention, an optical bandpass filter is provided to restrict the wavelengths of the low coherent beams within a prescribed range of wavelengths. That is, the optical bandpass filter has specific transmission characteristics to adjust the full width at half maximum (FHM) in the spectrum of the low coherent beams, thus minimizing effects (or influences) on spatial resolutions due to chromatic dispersions. The beams transmitted through the optical bandpass filter are branched to produce measurement beams and local beams. The measurement beams are directly transmitted towards the measured optical circuit without the intervention of the dispersion shifted fiber. The local beams are introduced into the second optical path, which includes the spatial optical path. Incidentally, the spatial optical path is formed by a collimator lens and a reflecting mirror, which are spaced apart by a prescribed distance.

BRIEF DESCRIPTION OF THE DRAWINGS

These and other objects, aspects, and embodiments of the present invention will be described in more detail with reference to the following drawing figures, in which.

DESCRIPTION OF THE PREFERRED EMBODIMENTS

This invention will be described in further detail by way of examples with reference to the accompanying drawings.

[A] First Embodiment

Figure 1:
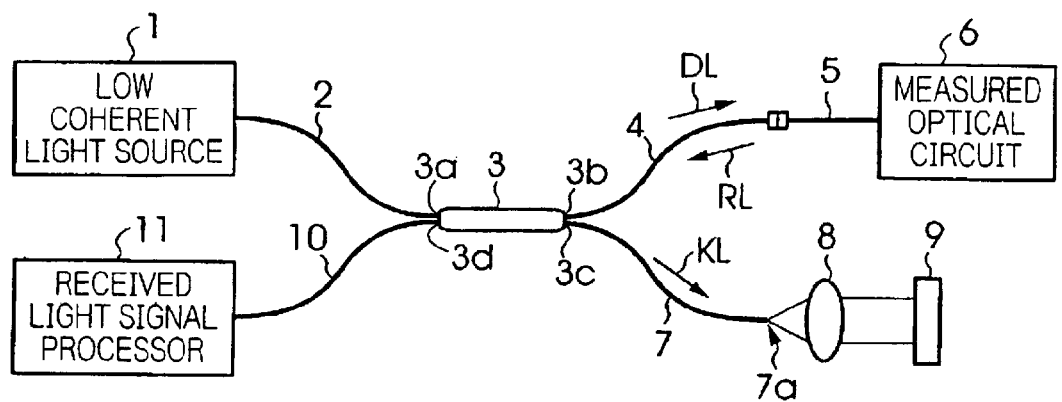
FIG. 1 is a system diagram diagrammatically showing optical connections between components for use in a low coherent reflectometer in accordance with a first embodiment of the invention.
Figure 8:
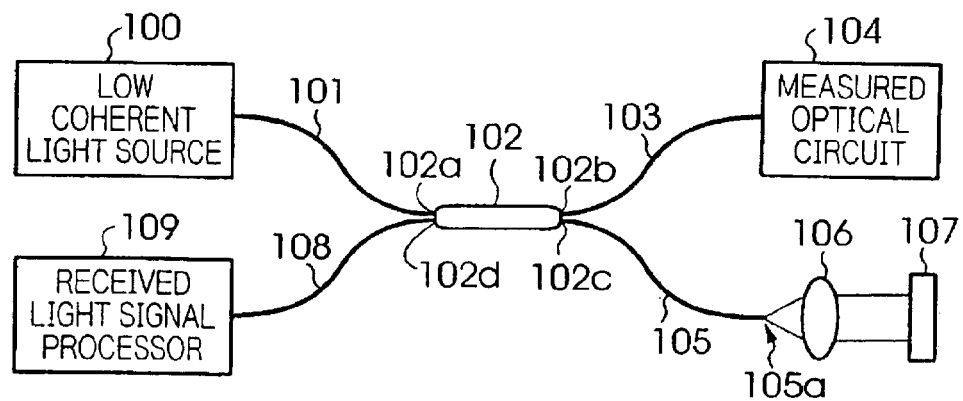
FIG. 8 is a system diagram diagrammatically showing optical connections between components for use in the conventional low coherent reflectometer.

FIG. 1 shows a simplified configuration of a low coherent reflectometer in accordance with a first embodiment of the invention. Herein, reference numeral 1 designates a low coherent light source that comprises a light emitting diode (LED) for producing low coherent light beams. The low coherent light source 1 is adjusted to produce low coherent beams having a prescribed range of wavelengths, a center wavelength of which is set to 1.55 µm, for example.

One end of an optical fiber 2 is connected to an outgoing terminal of the low coherent light source 1. Reference numeral 3 designates an optical coupler having four ports, which are respectively designated by reference numerals 3a to 3d. The other end of the optical fiber 2 is connected to the port 3a of the optical coupler 3. In the optical coupler 3, low coherent beams input to the port 3a are branched in response to a prescribed intensity ratio (e.g., one-to-one ratio), so that branched beams are output from the ports 3b and 3c respectively. One end of an optical fiber 4 is connected to the port 3b of the optical coupler 3.

The other end of the optical fiber 4 is connected to a measured optical circuit 6 by way of a dispersion shifted fiber (abbreviated as 'DSF') 5. The dispersion shifted fiber 5 has the prescribed characteristic that the dispersion value becomes approximately zero within the wavelength range of the low coherent beams output from the low coherent light source 1. The length of the dispersion shifted fiber 5 is adjusted to provide a certain optical path length, which is approximately equal to the spatial optical path length for propagation of local beams, with respect to low coherent beams having the prescribed wavelength range output from the low coherent light source 1. In addition, the optical fiber 4 has a length that is approximately equal to the length of an optical fiber 7, which will be described later. A first optical path is formed connecting the port 3b of the optical coupler 3, optical fiber 4, dispersion shifted fiber 5, and measured optical circuit 6. In the first optical path, beams output from the port 3b of the optical coupler 3 are transmitted through the optical fiber 4 and the dispersion shifted fiber 5 to reach the measured optical circuit 6; then, reflected beams are transmitted backwards through the dispersion shifted fiber 5 and the optical fiber 4 to reach the port 3b of the optical coupler 3.

One end of the optical fiber 7 is connected to the port 3c of the optical coupler 3. Reference numeral 8 designates a collimator lens whose focal point is set at a terminal end 7a of the optical fiber 7. Reference numeral 9 designates a reflecting mirror that reflects incoming beams propagated thereto via the collimator lens 8. The reflecting mirror 9 is placed on a stage (not shown) that is moved to vary the distance between the collimator lens 8 and the reflecting mirror 9. A second optical path is formed connecting the port 3c of the optical coupler 3, optical fiber 7, collimator lens 8, and reflecting mirror 9. In the second optical path, beams output from the port 3c of the optical coupler 3 are transmitted through the optical fiber 7 and then propagate towards the reflecting mirror 9 via the collimator lens 8; thereafter, reflected beams propagate backwards via the collimator lens 8 and are then transmitted backwards through the optical fiber 7 to reach the port 3c of the optical coupler 3.

One end of an optical fiber 10 is connected to the port 3d of the optical coupler 3, while the other end is connected to a received light signal processor 11. The received light signal processor 11 provides two light receiving elements (not shown) that perform photoelectric conversion on incoming beams from the optical fiber 10 to produce electric signals respectively. In addition, the light receiving elements amplify differences between the electric signals.

Next, the operations of the low coherent reflectometer of the first embodiment will be described in detail. First, low coherent beams leaving from the low coherent light source 1 are branched by the optical coupler 3. The optical coupler 3 produces two kinds of branched beams, namely measurement beams DL and local beams KL. The measurement beams DL are introduced into the optical fiber 4 and the dispersion shifted fiber 5 towards the measured optical circuit 6. The measurement beams DL are reflected at a certain reflecting point of the measured optical circuit 6, which in turn generates reflected measurement beams RL. The reflected measurement beams RL are sequentially transmitted through the dispersion shifted fiber 5 and the optical fiber 4 and are input to the port 3b of the optical coupler 3. Transmission of the measurement beams DL and the reflected measurement beams RL within the optical fiber 4 may provide dispersion as a result of the dispersion characteristics of the optical fiber 4. In contrast, dispersions are not caused by the transmission of the aforementioned beams DL and RL within the dispersion shifted fiber 5.

The local beams KL, which correspond to a part of the branched beams produced by the optical coupler 3 based on the low coherent beams, are output from the port 3c of the optical coupler 3. The local beams KL are transmitted through the optical fiber 7 and are then output from its terminal end 7a. Then, the local beams KL are converted to parallel beams by the collimator lens 8, so that the parallel beams propagate towards the reflecting mirror 9 and are reflected. The reflected local beams (KL) are subjected to convergence by the collimator lens 8, so that the converged beams are input to the optical fiber 7 from its terminal end 7a. Thus, the reflected local beams (KL) are transmitted through the optical fiber 7 and are then input to the port 3c of the optical coupler 3.

In the above, the local beams KL output from the terminal end 7a of the optical fiber 7 propagate towards the collimator lens 8 in the space therebetween; then, they are converted to parallel beams, which further propagate towards the reflecting mirror 9 in the space therebetween. That is, the local beams KL propagate through a spatial optical path from the terminal end 7a of the optical fiber 7 to the reflecting mirror 9. The reflected local beams propagate backwards through the aforementioned spatial optical path from the reflecting mirror 9 to the terminal end 7a of the optical fiber 7. No chromatic dispersion is caused during propagation of the (reflected) local beams KL. Similarly, no chromatic dispersion is caused during transmission of the measurement beams DL and the reflected measurement beams RL in the dispersion shifted fiber 5. As described before, the length of the dispersion shifted fiber 5 is determined to provide a certain optical path length, which is approximately equal to the spatial optical path length for propagation of the local beams KL, with respect to the low coherent beams having the prescribed wavelength range output from the low coherent light source 1. Therefore, the chromatic dispersion of the reflected measurement beams RL input to the port 3b of the optical coupler 3 is approximately equal to the chromatic dispersion of the reflected local beams (KL) input to the port 3c of the optical coupler 3.

The reflected measurement beams RL and the reflected local beams (KL) are combined by the optical coupler 3. If the length of the first optical path for transmission of the measurement beams DL and the reflected measurement beams RL becomes equal to the length of the second optical path for transmission of the local beams KL, interference occurs in the optical coupler 3. A part of the combined beams, which are produced by combining the reflected measurement beams RL and the reflected local beams (KL) in the optical coupler 3, is supplied to the received light signal processor 11 via the port 3d. In the received light signal processor 11, the light receiving elements perform photoelectric conversion on the combined beams output from the port 3d of the optical coupler 3 to produce electric signals. In addition, the light receiving elements also perform differential amplification on the electric signals.

The aforementioned first embodiment is designed to roughly eliminate effects (or influences) that are imparted on the spatial resolution in the measurement due to chromatic dispersions when the length of the dispersion shifted fiber 5 is adjusted to be equivalent to the length of the spatial optical path for transmission of the local beams. In practice, if an optical fiber is pre-installed in the measured optical circuit 6, it is impossible to completely eliminate the effects imparted on the spatial resolution in the measurement due to the chromatic dispersions. However, even if an optical fiber is pre-installed in the measured optical circuit 6, it is certainly possible to reduce the effects to some extent.

Figure 2A:
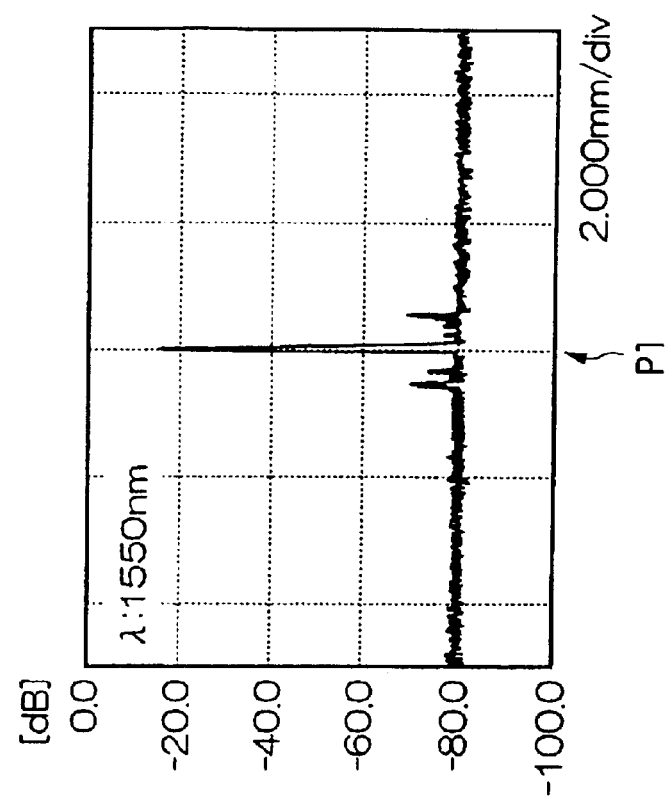
FIG. 2A is a graph showing a signal waveform that is measured by a low coherent reflectometer which does not include a dispersion shifted fiber within an optical path for transmission of measurement beams.
Figure 2B:
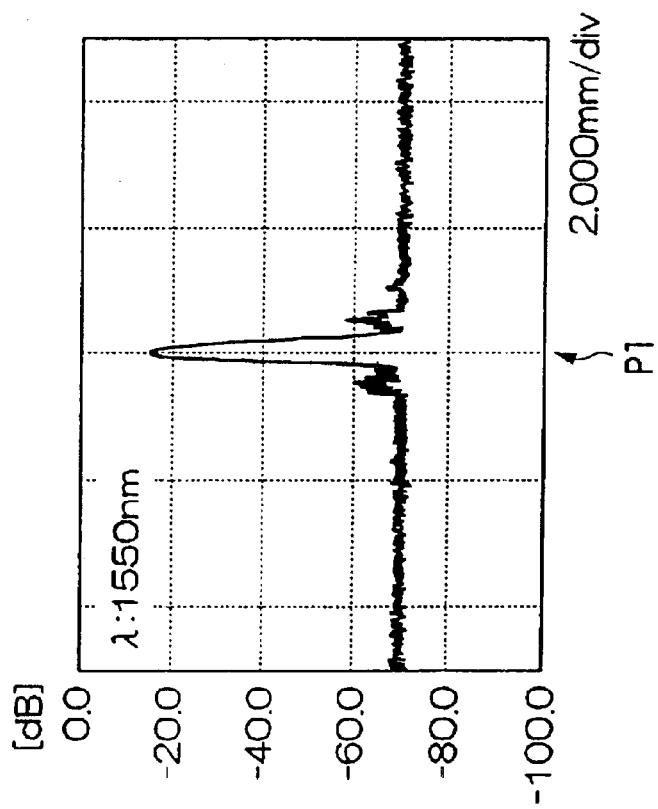
FIG. 2B is a graph showing a signal waveform that is measured by a low coherent reflectometer which includes the dispersion shifted fiber within the optical path for transmission of measurement beams.

Examples of measurement results that are produced by the low coherent reflectometer of the first embodiment for measuring the measured optical circuit 6 are shown in FIGS. 2A and 2B. Specifically, FIG. 2A shows variations of signal waveforms measured by the low coherent reflectometer which does not include the dispersion shifted fiber 5, while FIG. 2B shows variations of signal waveforms measured by the low coherent reflectometer which includes the dispersion shifted fiber 5. In FIGS. 2A and 2B, the vertical axis represents the signal level in units of decibels [dB], whereas the horizontal axis represents a part of the measurement range or area provided inside the measured optical circuit 6. The length of the spatial optical path for propagation of the local beams is set to 70 cm, for example.

Comparing these two graphs of FIGS. 2A and 2B, peaks 'PI' emerge at signal levels in correspondence with the reflecting point of the measured optical circuit 6. Herein, the width at the peak portion shown in FIG. 2B is narrower than the width at the peak portion shown in FIG. 2A. This indicates that the spatial resolution in the measurement is improved by the provision of the dispersion shifted fiber 5.

Due to the provision of the dispersion shifted fiber 5 within the first optical path for transmission of the measurement beams DL and the reflected measurement beams RL, the low coherent reflectometer of the first embodiment is capable of approximately eliminating the difference between the chromatic dispersion of the measurement beams DL and the reflected measurement beams RL caused by transmission through the optical fibers 4 and 5 and the chromatic dispersion of the local beams KL caused by transmission through the optical fiber 7 and propagation through the spatial optical path. Thus, it is possible to maintain a high spatial resolution in the measurement using the low coherent reflectometer.

[B] Second Embodiment

Figure 3:
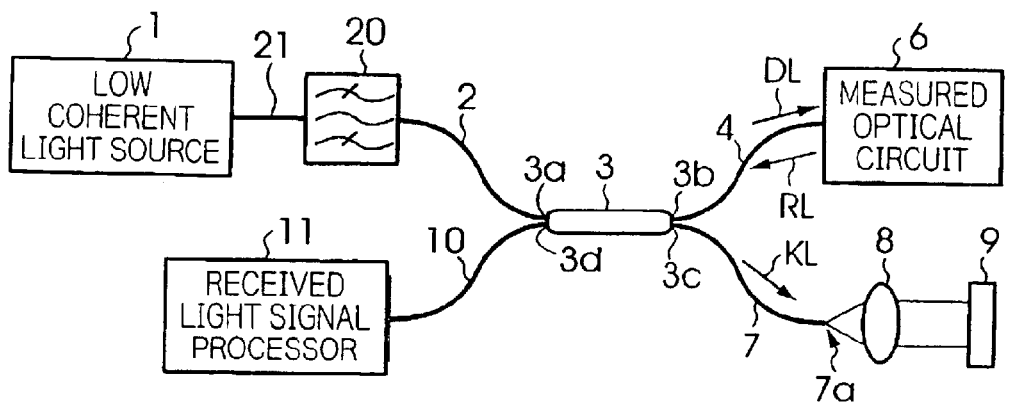
FIG. 3 is a system diagram showing optical connections between components for use in a low coherent reflectometer in accordance with a second embodiment of the invention.

FIG. 3 shows a simplified configuration of a low coherent reflectometer in accordance with a second embodiment of the invention, wherein parts equivalent to those shown in FIG. 1 are designated by the same reference numerals, and the descriptions thereof will be omitted as necessary. The low coherent reflectometer of the second embodiment differs from the low coherent reflectometer of the first embodiment in two points. First, the dispersion shifted fiber 5 shown in FIG. 1 is removed so that the port 3b of the optical coupler 3 is directly connected to the measured optical circuit 6 by way of the optical fiber 4 only. Second, an optical bandpass filter 20 and an optical fiber 21 are additionally provided between the low coherent light source 1 and the optical fiber 2. That is, the low coherent light source 1 is connected to the optical bandpass filter 20 via the optical fiber 21, wherein one end of the optical fiber 2 is connected to the optical bandpass filter 20 while the other end is connected to the port 3a of the optical coupler 3.

The aforementioned low coherent reflectometer of the second embodiment is designed in consideration of effects which are imparted on the spatial resolution in the measurement and which become noticeable if the spectral width (or full width at half maximum) of the low coherent beams output from the low coherent light source 1 is relatively large. That is, the second embodiment aims at reducing the effects on the spatial resolution by narrowing the spectral width of the low coherent beams output from the low coherent light source 1. For this reason, the second embodiment provides the optical bandpass filter 20 to narrow the spectral width of the low coherent beams to some extent.

Next, a description will be given with respect to the relationship between the spectral width (i.e., fill width at half maximum) of the low coherent beams and the spatial resolution in the measurement of the low coherent reflectometer. In general, it is possible to approximately estimate the effects on the chromatic dispersions in the spatial resolution, which are detected by the low coherent reflectometer based on a prescribed measurement method, in accordance with the following formula (1) which is given in consideration of the spectral characteristics of the low coherent light source 1 and the dispersion characteristics of the optical fibers 2, 4, 7, 10, etc.

$$\Delta z_r = \Delta z_1 \sqrt{1 + \left(\frac{2L}{L_D}\right)^2} \quad (1)$$

In the above formula (1), $\Delta z_r$ denotes the spatial resolution of the low coherent reflectometer which is calculated based on the assumption that the optical fibers 2, 4, 7, and 10 impart substantially no effects on the dispersions. This spatial resolution $\Delta z_r$ is approximately given by the following equation (2).

$$\Delta z_t \approx \frac{1}{2n} \cdot \frac{\lambda^2}{\Delta \lambda} \quad (2)$$

In the above equation (2), 'n' denotes the refractive indexes of optical transmission media (such as the optical fibers 2, 4, 7, 10, etc.); '$\lambda$' denotes the center wavelength of low coherent beams output from the low coherent light source 1; and '$\Delta\lambda$' denotes the value of 'FWHM' (namely, full width at half maximum) for the center wavelength of the low coherent beams.

In the formula (1), '$L_D$' denotes a specific length called the dispersion length that represents an effect on the dispersion, and it is given by the following equation (3).

$$L_D \approx \frac{4n^2 \Delta z_1^2}{\lambda^2 cD} \quad (3)$$

In the above equation (3), 'c' denotes the speed of light; and 'D' denotes a dispersion parameter of the optical fiber.

In the formula (1), 'L' denotes a one-way length towards the reflecting point of the measured optical circuit 6. According to the second embodiment, the low coherent reflectometer is designed such that dispersing effects are substantially cancelled between a first optical path for transmission of the measurement beams DL and the reflected measurement beams RL and a second optical path for transmission of the local beams KL. Therefore, 'L' substantially corresponds to the length of the spatial optical path between the collimator lens 8 and the reflecting mirror 9, which causes a difference between the chromatic dispersions in the aforementioned optical paths.

By substituting the equations (2) and (3) for the aforementioned formula (1), it is possible to produce the following equation (4).

$$\Delta z_r = \frac{\lambda^2}{2n\Delta\lambda} \sqrt{1 + \left\{2LcD\left(\frac{\Delta\lambda}{\lambda}\right)^2\right\}^2} \quad (4)$$

As described above, by setting the optical transmission media and the center wavelength of the light source, it is possible to calculate the spatial resolution $\Delta z_r$ in consideration of the effects on the dispersions due to the optical fibers 2, 4, 7, 10, etc. It can be easily understood from the equation(4) that the spatial resolution $\Delta z_r$ depends upon the full width at half maximum in the spectrum of low coherent beams output from the low coherent light source 1 as well as the length of the prescribed interval corresponding to the spatial optical path which causes a difference between the chromatic dispersions detected for the first optical path for transmission of the measurement beams DL and the reflected measurement beams RL, and the second optical path for transmission of the local beams KL.

Figure 4:
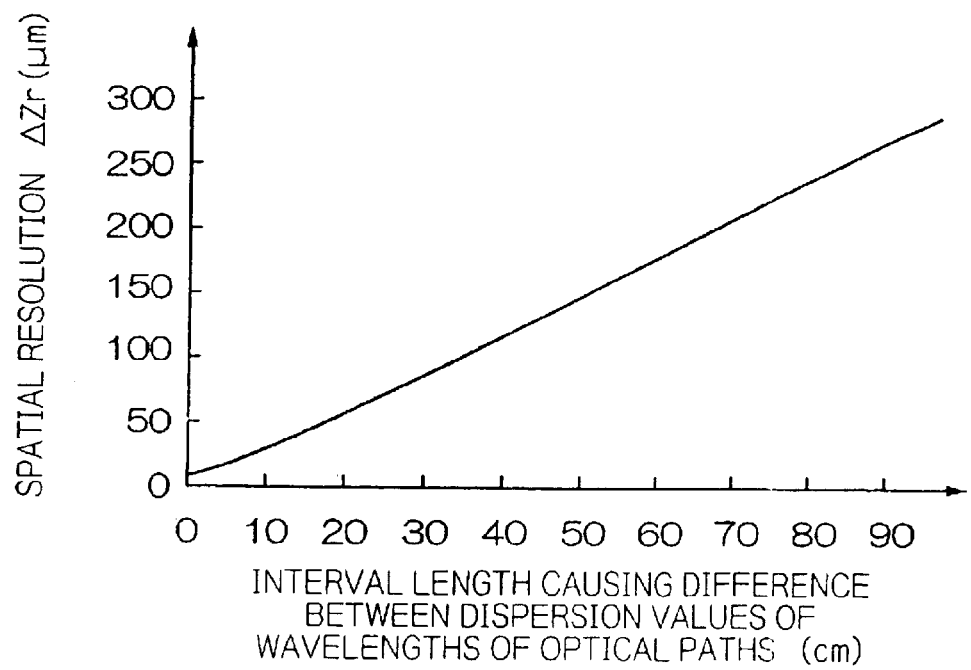
FIG. 4 is a graph showing the relationship between the spatial resolution $\Delta z_r$ and the interval length which causes differences between the chromatic dispersions of the beams in the optical paths.
Figure 5:
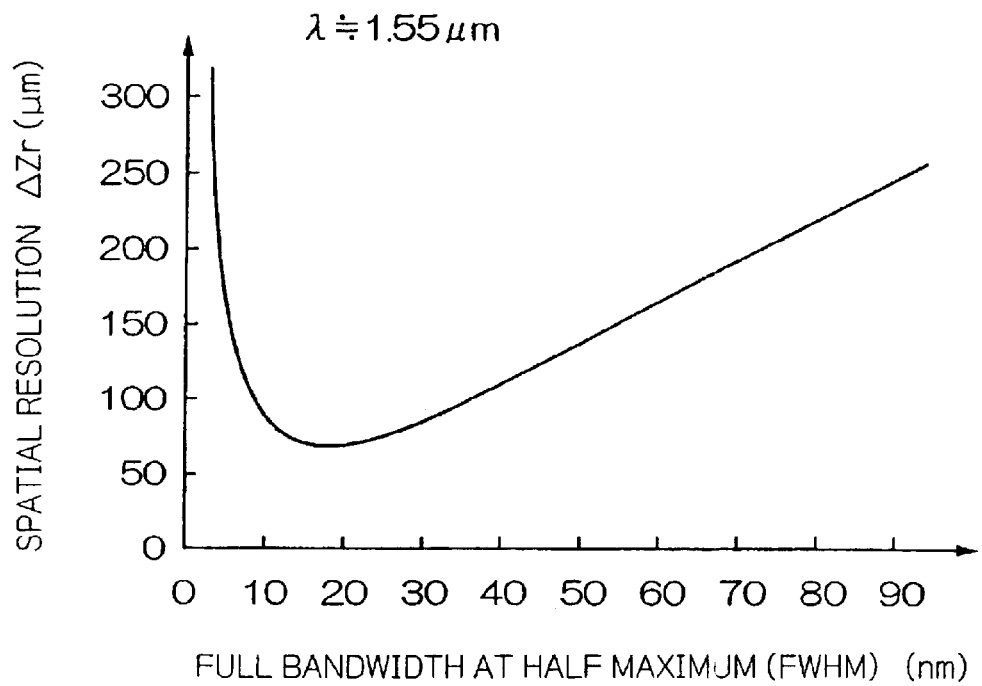
FIG. 5 is a graph showing the relationship between the spatial resolution $\Delta_r$ and the FWHM value in the spectrum of low coherent beams.

FIG. 4 shows the relationship between the spatial resolution Δ z, and the length of the interval that causes a difference between the chromatic dispersions in the optical paths. It shows that as the interval length becomes longer, the value of the spatial resolution $\Delta z_r$ increases proportionally, so that the property of the low coherent reflectometer deteriorates in the spatial resolution $\Delta z_r$. FIG. 5 shows the relationship between the spatial resolution $\Delta z_r$ and the full width at half maximum (simply, referred to as 'FWHM') in the spectrum of low coherent beams output from the low coherent light source 1. Concretely speaking, the graph of FIG. 5 is given with respect to the prescribed center wavelength of 1.55 μm set for the low coherent beams output from the low coherent light source 1. It shows that when the FWHM value of the low coherent light source 1 is set to 18 μm or so, the spatial resolution $\Delta z_r$ becomes a minimum, so that the low coherent reflectometer provides the best performance in measurement with respect to the spatial resolution $\Delta z_r$. If the FWHM value is reduced to be lower than 10 nm, the spatial resolution $\Delta z_r$ suddenly increases, so that the low coherent reflectometer suddenly deteriorates in the spatial resolution $\Delta \Delta z_r$. In contrast, if the FWHM value is increased to be higher than 30 nm, the spatial resolution $\Delta z_r$ gradually increases, so that the low coherent reflectometer gradually deteriorates in the spatial resolution $\Delta z_r$.

Figure 6:
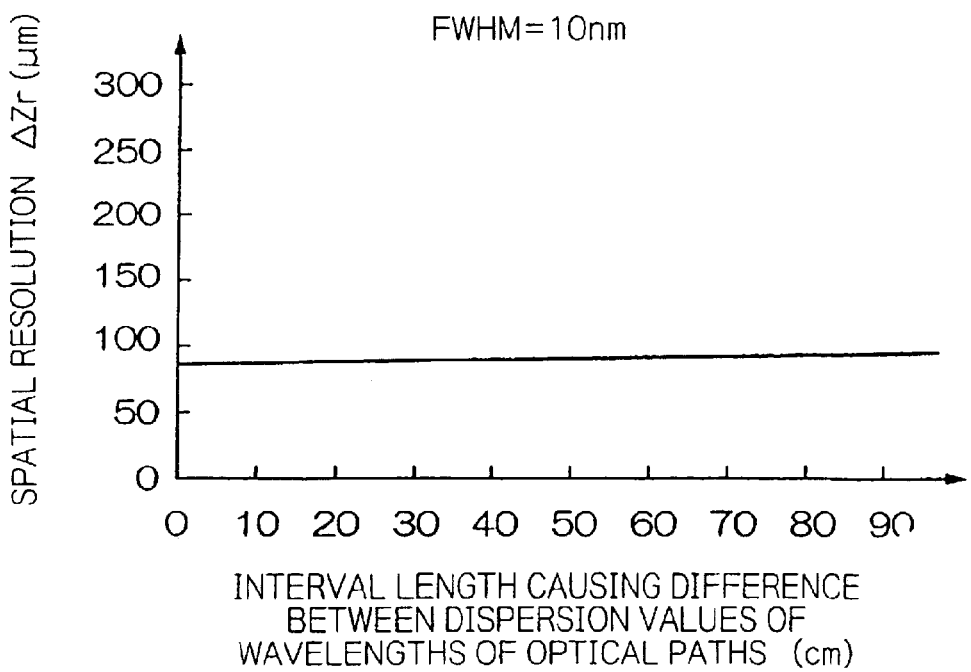
FIG. 6 is a graph showing the relationship between the spatial resolution $\Delta_r$ and the interval length which cause differences between the chromatic dispersions of the beams in the optical paths for the case when the FWHM value is set to 10 nm.

The aforementioned graphs of FIGS. 4 and 5 clearly show that the spatial resolution becomes a minimum at a certain FWHM value in relation to a certain length of 'L'. Therefore, it is possible to adequately select the certain FW value that makes the variations of the spatial resolution a minimum in response to variations of the length 'L'. FIG. 6 shows the relationship between the spatial resolution $\Delta z_r$ and the length of the interval that causes a difference between the chromatic dispersions in the optical paths when the FWHM value is fixed at a certain value. Concretely speaking, the graph of FIG. 6 is for the case when the FWHM value is set to 10 nm, and the dispersion parameter D of the optical fiber is assumed to be at a common value of 17 ps/km-nm.

FIG. 6 shows that the spatial resolution $\Delta z_r$ does not vary substantially even though the interval length causing the difference between the chromatic dispersions in the optical paths is varied to some extent. That is, when the center wavelength of the low coherent beams output from the low coherent light source 1 is set to 1.55 μm, the transmission characteristics of the optical bandpass filter 20 should be set to allow transmission of low coherent beams whose wavelength substantially matches the aforementioned wavelength of 1.55 μm ±5 nm, for example. In this case, the spatial resolution $\Delta z_r$ would not deteriorate very much even though the reflecting mirror 9 placed on the stage (not shown) is moved to vary the spatial optical path length measured between the collimator lens 8 and the reflecting mirror 9.

Figure 7A:
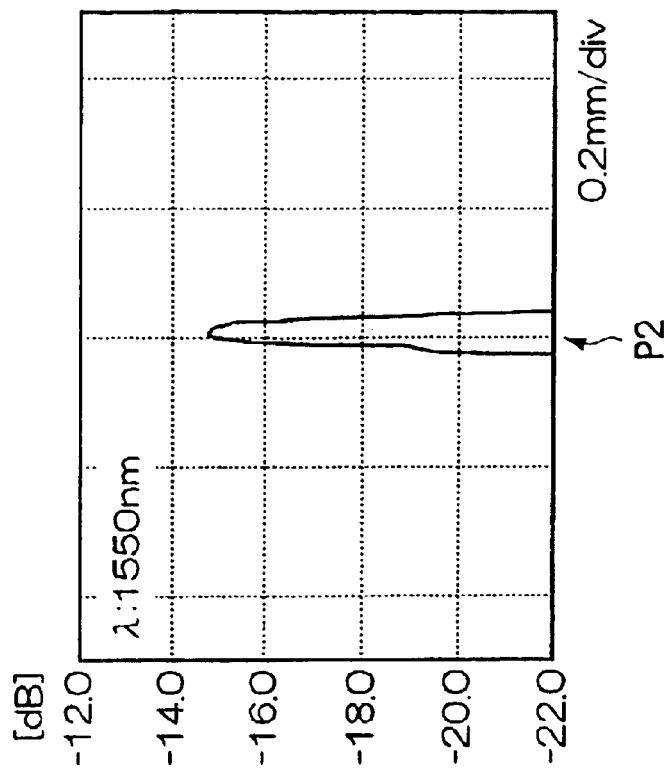
FIG. 7A is a graph showing a signal waveform measured by the low coherent reflectometer of the second embodiment that allows transmission of low coherent beams within ±40 nm about the prescribed wavelength.
Figure 7B:
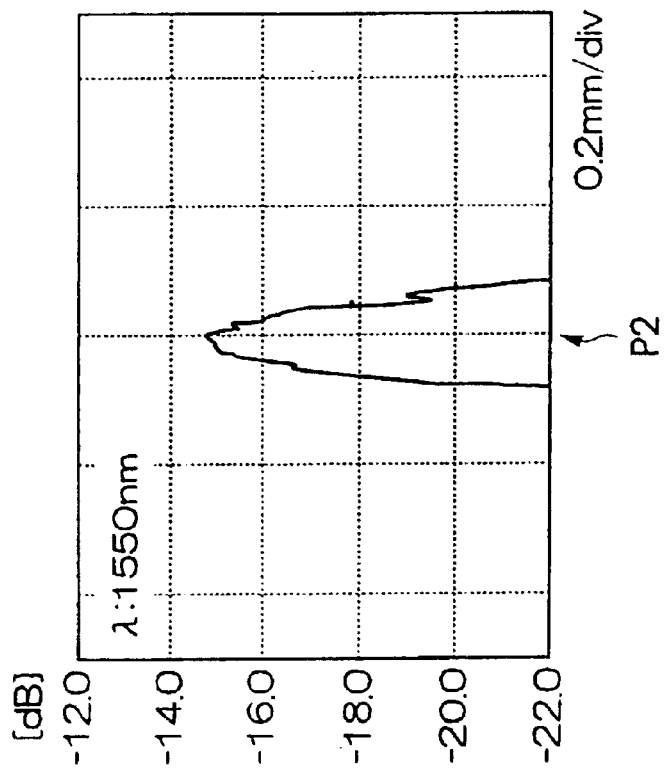
FIG. 7B is a graph showing a signal waveform measured by the low coherent reflectometer of the second embodiment that allows transmission of low coherent beams within ±7.5 nm about the prescribed wavelength.

FIGS. 7A and 7B show examples of the measurement results that are produced by the low coherent reflectometer of the second embodiment, which performs the prescribed measurement on the measured optical circuit 6. Specifically, FIG. 7A shows a signal waveform that is measured by the low coherent reflectometer in which the optical bandpass filter 20 has a transmission bandwidth which allows transmission of low coherent beams whose wavelength substantially matches the aforementioned wavelength of 1.55 μm ±40 nm, whereas FIG. 7B shows a signal waveform that is measured by the low coherent reflectometer in which the optical bandpass filter 20 has a transmission bandwidth which allows transmission of low coherent beams whose wavelength substantially matches the aforementioned wavelength of 1.55 μm ±7.5 nm.

Both of the signal waveforms shown in FIGS. 7A and 7B have peaks 'P2' in correspondence with the reflecting point of the measured optical circuit 6. Herein, the width of the peak portion shown in FIG. 7B is narrower than the width of the peak portion of the signal waveform shown in FIG. 7A. This indicates that the spatial resolution is improved by precisely setting small margins for the wavelength in the transmission bandwidth of the optical bandpass filter 20.

Similar to the foregoing first embodiment, the second embodiment can estimate the difference between the chromatic dispersion of the measurement beams DL and the reflected measurement beams RL transmitted in the optical fiber 4, and the chromatic dispersion of the local beams KL transmitted in the optical fiber 7 and propagated in the spatial optical path between the collimator lens 8 and the reflecting mirror 9. The second embodiment is characterized by providing the optical bandpass filter 20 for restricting the FWHM value of low coherent beams output from the low coherent light source 1, by which the spatial resolution $\Delta z_r$ is prevented from deteriorating very much. In short, the low coherent reflectometer of the second embodiment is advantageous because it can demonstrate high performance in the measurement with respect to the spatial resolution.

As described heretofore, this invention has a variety of technical features and effects, which will be described below.

(1) The low coherent reflectometer of this invention is characterized by providing a compensator that compensates for a difference between chromatic dispersions in different optical paths. Hence, it is possible to eliminate effects on the spatial resolution due to chromatic dispersions. Therefore, it is possible to maintain a high spatial resolution in the measurement of the low coherent reflectometer.

(2) The high spatial resolution can be obtained by only connecting an optical fiber for dispersion compensation within a first optical path for transmission of measurement beams.

(3) The low coherent reflectometer of this invention is also characterized by providing an adjuster for adjusting the full width at half maximum (or FW) of the spectrum of low coherent beams output from the light source. This allows an optimal setup for an FWHM value to minimize the effects on the spatial resolution due to chromatic dispersions. Hence, it is possible to ensure substantially no variations of the spatial resolution even though the spatial optical path length for propagation of the local beams is varied.

(4) Specifically, the low coherent reflectometer uses an optical bandpass filter for adjusting the FWHM value of spectrum of low coherent beams output from the light source. Therefore, it is possible to select an optimal FWHM value which minimizes the effects on the spatial resolution due to chromatic dispersions with a simple configuration.

As this invention may be embodied in several forms without departing from the spirit of essential characteristics thereof the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A low coherent reflectometer comprising:
   a light source;
   a branching element for branching beams output from the light source into measurement beams and local beams, wherein the measurement beams are introduced into a first optical path towards a measured optical circuit including a reflecting point, and the local beams are introduced into a second optical path including a spatial optical path;
   a combining element for combining reflected measurement beams entering from the first optical path and reflected local beams entering from the second optical path; and
   a compensator for compensating a difference between chromatic dispersions of the measurement beams in the first optical path and the local beams in the second optical path.

2. A low coherent reflectometer according to claim 1, wherein the compensator comprises a dispersion shifted fiber, which is arranged within the first optical path.

3. A low coherent reflectometer according to claim 1, wherein the compensator comprises an adjuster for adjusting a value of a full width at half maximum in spectrum of the beams output from the light source.

4. A low coherent reflectometer according to claim 1, wherein the compensator comprises an optical bandpass filter for restricting the beams output from the light source into a prescribed range of wavelengths.

5. A low coherent reflectometer comprising:
   a light source;
   an optical coupler having four ports, wherein beams output from the light source are input to a first port and are branched to produce measurement beams and local beams respectively so that the measurement beams are output from a second port and the local beams are output from a third port, and wherein reflected measurement beams input to the second port and reflected local beams input to the third port are combined, so that combined beams are output from a fourth port;
   a dispersion shifted fiber that is arranged within a first optical path between the second port of the optical coupler and a measured optical circuit including a reflecting point;
   a reflector that is arranged to terminate a second optical path including a spatial optical path for propagation of the local beams; and
   a received light signal processor for receiving and processing the combined beams output from the fourth port of the optical coupler.

6. A low coherent reflectometer according to claim 5, wherein a length of the dispersion shifted fiber is made substantially equal to a length of the spatial optical path.

7. A low coherent reflectometer according to claim 5, wherein the reflector comprises a collimator lens and a reflecting mirror which are spaced apart at a prescribed distance in the spatial optical path, and wherein the collimator lens converts the local beams to parallel beams, which propagate towards and are then reflected by the reflecting mirror.

8. A low coherent reflectometer comprising:
   a light source;
   an optical bandpass filter for adjusting a full width at half maximum in spectrum of beams output from the light source;
   an optical coupler having four ports, wherein the beams transmitted through the optical bandpass filter are input to a first port and are then branched to produce measurement beams and local beams so that the measurement beams are output from a second port and are transmitted through a first optical path towards a measured optical circuit including a reflecting point and the local beams are output from a third port and are transmitted through a second optical path including a spatial optical path, and wherein reflected measurement beams input to the second port and reflected local beams input to the third port are combined, so that combined beams are output from a fourth port;
   a reflector that is arranged to terminate the spatial optical path of the second optical path; and
   a received light signal processor for receiving and processing the combined beams output from the fourth port of the optical coupler.

9. A low coherent reflectometer according to claim 8, wherein the reflector comprises a collimator lens and a reflecting mirror which are spaced apart at a prescribed distance in the spatial optical path, and wherein the collimator lens converts the local beams to parallel beams, which propagate towards and are then reflected by the reflecting mirror, so that the reflected local beams are subjected to convergence by the collimator lens to produce converged beams, which are transmitted to the third port of the optical coupler.

10. A low coherent reflectometer according to claim 7 or 9, wherein the reflecting mirror is made movable along an optical axis to vary the distance between the collimator lens and the reflecting mirror.

* * * * *